Jan. 19, 1960   L. WEINBERG   2,922,128
WAVE FILTER
Filed March 23, 1955   6 Sheets-Sheet 1
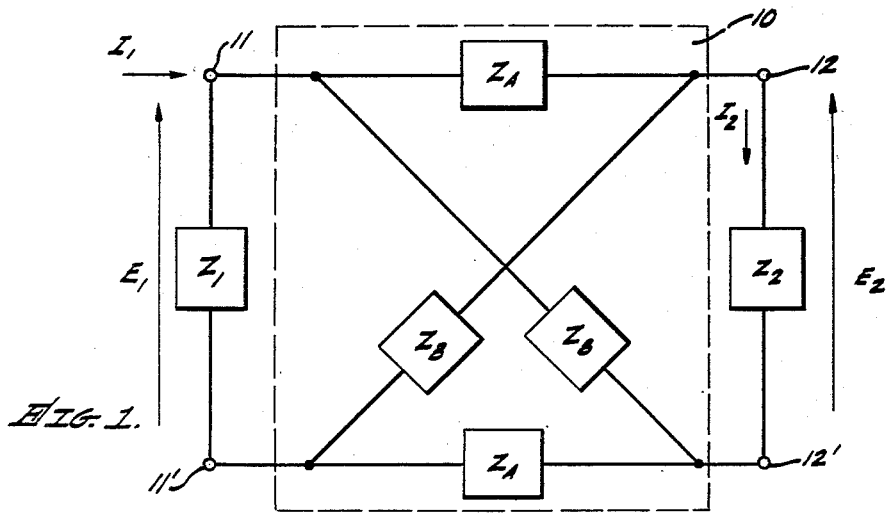
Fig. 1.
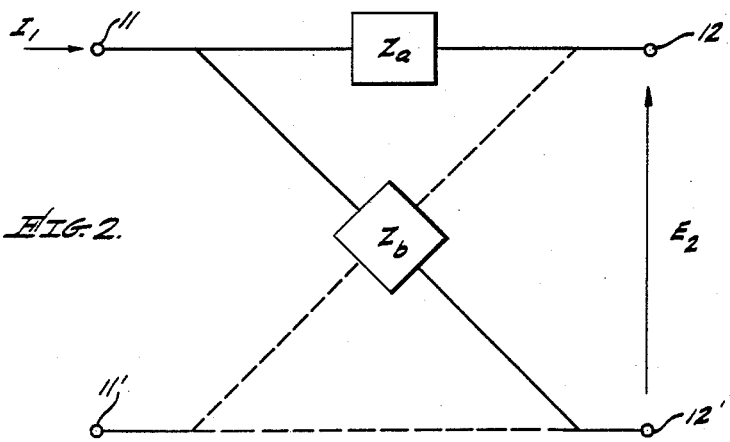
Fig. 2.
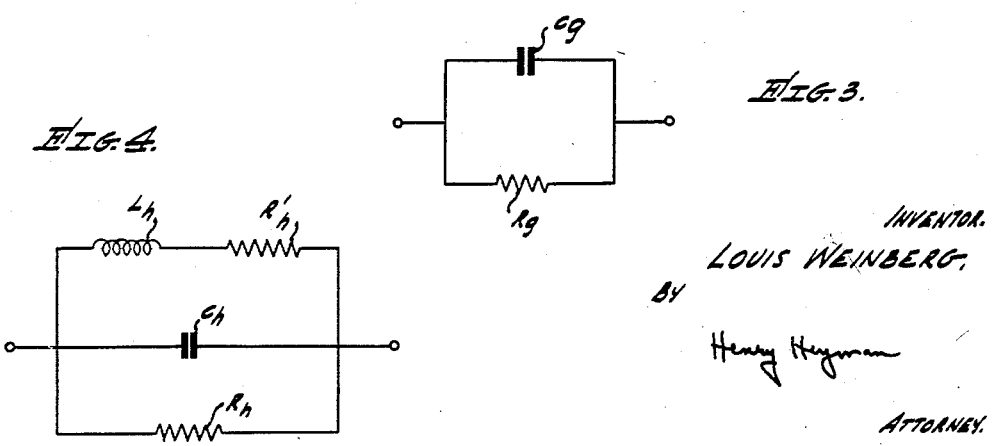
Fig. 3.
Fig. 4.
INVENTOR.
LOUIS WEINBERG
BY
Henry Heyman
ATTORNEY.

Jan. 19, 1960

L. WEINBERG 2,922,128

WAVE FILTER

Filed March 23, 1955

INVENTOR.
LOUIS WEINBERG,
BY
Henry Heyman
ATTORNEY.

Jan. 19, 1960

L. WEINBERG 2,922,128

WAVE FILTER

Filed March 23, 1955

INVENTOR.
LOUIS WEINBERG,
BY
Henry Heyman
ATTORNEY.

Jan. 19, 1960  L. WEINBERG  2,922,128
WAVE FILTER
Filed March 23, 1955  6 Sheets-Sheet 5

INVENTOR.
LOUIS WEINBERG,
BY
Henry Heymann
ATTORNEY.

INVENTOR.
LOUIS WEINBERG,
BY
Henry Heyman
ATTORNEY.

United States Patent Office 2,922,128
Patented Jan. 19, 1960

2,922,128

WAVE FILTER

Louis Weinberg, Los Angeles, Calif., assignor to Hughes Aircraft Company, Culver City, Calif., a corporation of Delaware Application March 23, 1955, Serial No. 496,121

3 Claims. (Cl. 333—74)

This invention relates generally to wave filters, and more particularly relates to a symmetrical and balanced lattice structure, terminated at each end in a network and providing a predetermined transfer function; it also relates to a new method of computing the circuit constants of the elements of the lattice structure.

Typical of such wave filters to which this invention relates are: low-pass, high-pass, band-pass and band-elimination filters for passing or eliminating predetermined bands of frequencies. Such wave filters are also suitable as corrective networks to equalize a magnitude or a phase characteristic of a signal, or a combined magnitude and phase characteristic. These wave filters also find application as delay networks and coupling networks between two active circuit elements such as thermionic tubes or transistors. The transfer function of the wave filter of this invention may relate to the transfer impedance, the transfer admittance, the transfer voltage ratio or the transfer current ratio.

The problem of computing the circuit constants of the elements of the lattice structure has given rise to a great number of methods, each of which yields a more or less different wave filter. Many methods of synthesis were applied to two-terminal-pair network structures having no terminations at their respective input and output ends. Those methods of synthesis which resulted in a symmetrical and balanced lattice structure often called for components which were difficult to realize physically such as pure inductances or ideal transformers. Furthermore, when terminations were used with these networks the transfer function was changed.

More recent methods of synthesis are able to compute the constants of the elements of symmetrical and balanced lattice structures which are terminated in pure resistances. One of these methods is described in "Network Analysis and Feedback Amplifier Design" by H. W. Bode, D. Van Nostrand Co., New York, N.Y., 1945. The resulting lattice structure usually requires the inclusion of elements providing mutual inductance and also calls for pure inductance elements. Another method of synthesis, this one yielding an unbalanced network, is described in "Synthesis of Reactance Four-Poles" by S. Darlington, Journal of Mathematical Physics, September 1939, pages 257–353. The unbalanced structure resulting from the Darlington method requires, in addition to mutual inductance and pure inductance elements, the inclusion of ideal transformers. It will, of course, be obvious that it is impossible to build an ideal transformer, nor is it feasible to provide an inductor having no resistance associated therewith. Consequently, the structure resulting from each prior art synthesis method could not be physically realized and the performance of the physically realizable network deviates from that predicted by the synthesis.

Neither of the above described methods will lend themseves to the computation of the constants of the elements of the overall network structure if the termination networks include capacitance elements such as the interelectrode capacitance of a vacuum tube.

It is therefore an object of this invention to provide an improved wave filter comprising a balanced symmetrical lattice structure, and including termination networks, said wave filter realizing the predetermined transfer characteristic within a constant multiplier.

It is a further object of this invention to provide an improved terminated wave filter which requires neither mutual inductance elements, pure inductance elements, nor ideal transformer elements.

It is another object of this invention to provide an improved wave filter which is terminated across its input and output by a parallel combination of resistance and capacitance elements.

Still a further object of this invention is to provide an improved wave filter which comprises as its elements only components physically realizable and which are determined accurately by synthesis.

Still another object of this invention is to provide an improved wave filter comprising a balanced symmetrical lattice structure which may be terminated by capacitance elements such as the interelectrode capacitance of a thermionic tube.

The general nature of this invention may be explained most readily by a consideration of the solution of the problem presented by the design of a symmetrical balanced lattice structure which is terminated at each end in an impedance, and where the impedance comprises either a resistance element, a capacitance element, or a parallel combination of a resistance and a capacitance element. The resulting wave filter consists of the lattice structure and the terminating impedance elements and will have a given transfer function. Such a wave filter in accordance with the invention does not require mutual inductance elements, and will have associated with each pure inductance a series connected resistance element.

The nature of this invention will be more fully understood from the following description and by reference to the accompanying drawings of which:

Fig. 1 is a circuit diagram in block form of the wave filter of this invention;

Fig. 2 is a circuit diagram in block of the lattice structure included in the wave filter of Fig. 1;

Figs. 3 and 4 are circuit diagrams of two different branch networks which may be used in the wave filter of this invention;

Figure 12:
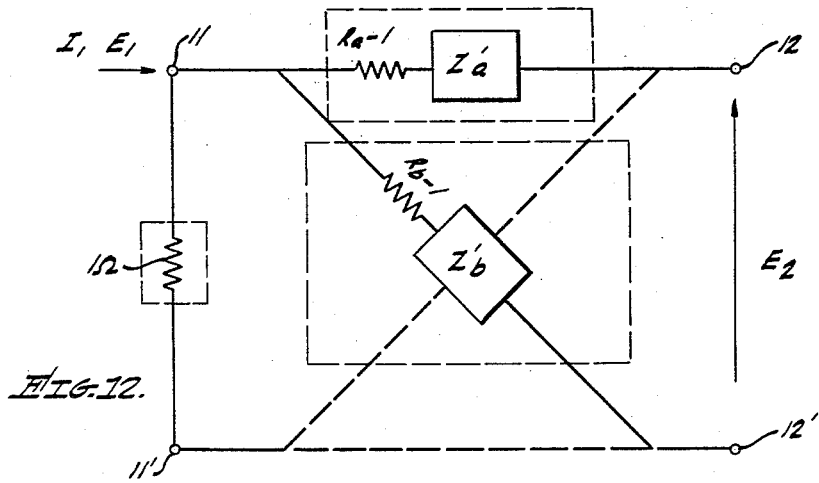
Figure 13:
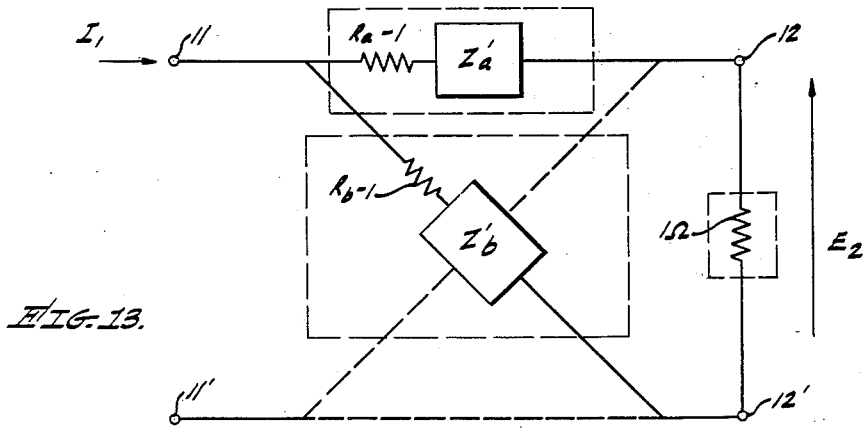
Figure 14:
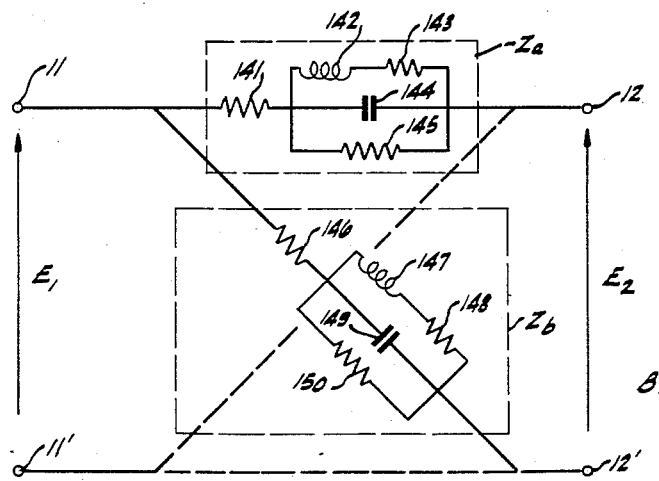
Figure 15:
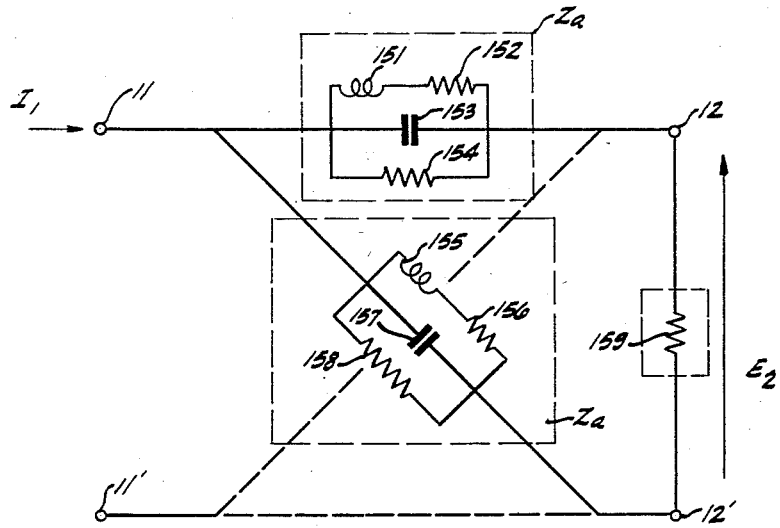
Figure 16:
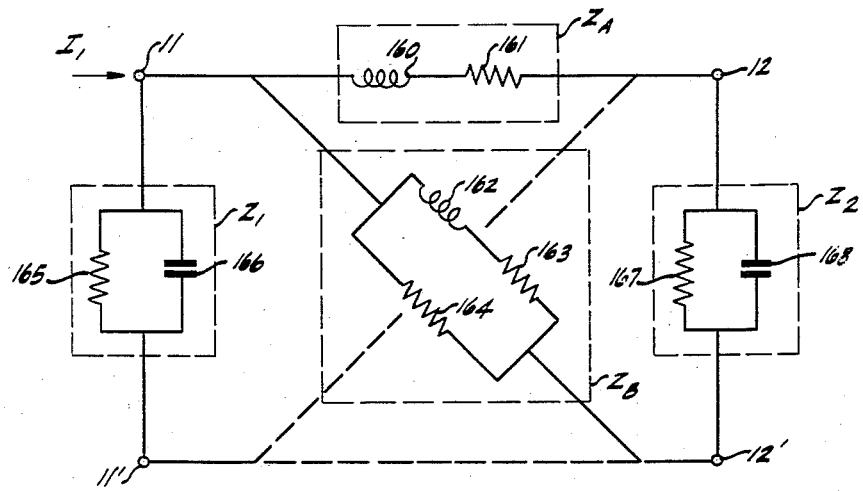

Figs. 10 to 13 are circuit diagrams in block form of a modified wave filter in accordance with this invention, showing equivalent forms thereof in order to explain its synthesis in successive steps in a different manner; and Figs. 14 to 16 are circuit diagrams of equivalent form of another modification of the wave filter of the invention having capacitive termination networks, in order to explain in detail its synthesis in successive steps in accordance with the method used for the filter of Figs. 10 to 13.

Referring now to the drawings wherein the same elements are designated by the same reference characters, and particularly to Fig. 1, there is illustrated a wave filter in accordance with the invention. The wave filter of Fig. 1 includes a balanced and symmetrical lattice structure 10 and has input terminals 11, 11' and output terminals 12, 12'. Connected across the input terminals 11, 11' is a first or terminating input network $Z_1$ and connected across the output terminals 12, 12' is a second or terminating output network $Z_2$. The lattice structure 10 comprises four branch networks, two of which are equal and are designated $Z_A$ and are connected between terminals 11, 12 and 11', 12' respectively, and the other two of which are equal and are designated $Z_B$ and are connected between terminals 11, 12' and 11', 12. For the sake of simplicity of representation all succeeding figures of the lattice structure will only show two of the four branch networks; the other two will be indicated by dotted lines.

Fig. 1 also defines the various voltages and currents flowing in the wave filter and which are used hereinafter in the description of the wave filter of this invention and the method of computing the constants of the elements of the lattice structure. Let $E_1$ and $E_2$ be the terminal voltage across the terminals 11, 11' and 12, 12' respectively. Let $I_1$ be the current entering terminal 11 of the lattice structure as indicated by the arrow. Let $I_2$ be the current leaving terminal 12 of the wave filter toward terminal 12'. The transfer function of the wave filter of Fig. 1 may then be expressed in terms of the voltages and currents in the following way:

$$\text{Transfer impedance} = Z_{12} = \frac{E_2}{I_1} \quad (1)$$

$$\text{Transfer admittance} = Y_{12} = \frac{I_2}{E_1} \quad (2)$$

$$\text{Transfer signal voltage ratio} = R_v = \frac{E_2}{E_1} \quad (3)$$

$$\text{Transfer signal current ratio} = R_I = \frac{I_2}{I_1} \quad (4)$$

The wave filter shown in Fig. 1 has certain characteristics which have not heretofore been incorporated in wave filters having a predetermined transfer function. In other words, the branch networks $Z_A$ and $Z_B$ neither contain any mutual inductance elements nor transformers nor any pure inductance elements. All inductance elements called for in the computation of the wave filter to realize a predetermined transfer function appear associated with a series resistance element so that physically realizable inductance components may be used. This eliminates the necessity of approximating a pure inductance element by high-Q coils and thereby changing the transfer function of the wave filter.

The terminating input and output networks $Z_1$ and $Z_2$ are subject to certain restrictions. The following terminating networks are possible. First, $Z_1$ and $Z_2$ may comprise only resistive elements which may be designated $R_1$ and $R_2$ and where $R_1$ and $R_2$ may be equal or unequal. Second, if the transfer function as defined by Equations 1 to 4 has a numerator which is of lower degree than the denominator, the first and second network $Z_1$ and $Z_2$ may comprise only capacitance elements $C_1$ and $C_2$ respectively. However, unless the capacitance elements are equal so that $C_1 = C_2 \equiv C$, the method of computing the wave filter to be outlined below is not applicable. Third, it is also possible to use a terminating input and output network $Z_1$ and $Z_2$ comprising a parallel combination of resistance and capacitance elements, but again the capacitance elements $C_1$ and $C_2$ in $Z_1$ and $Z_2$ must be equal.

In computing the constants of the elements of the lattice structure, two different methods are used depending on the impedances of the terminating input and output networks. Method I will be used when computing the constants of the wave filter when the terminating input network is equal to the terminating output network ($Z_1 = Z_2$). Method II will be used when computing the constants of the wave filter when the terminating input network is unequal to the terminating output network, ($Z_1 \neq Z_2$), i.e., where the resistance elements $R_1$ and $R_2$ contained in $Z_1$ and $Z_2$ respectively are unequal, ($R_1 \neq R_2$). Actually, method II is more general than method I and may be used to compute the constants for $Z_1 = Z_2$ also. However, the resulting lattice structure will contain coils with a somewhat higher Q which it is at times desirable to avoid.

Method I

In order to provide a better understanding of method I, reference is now made to Fig. 2 illustrating an open-circuited balanced and symmetrical lattice structure having four branch networks just as the lattice structure 10 of Fig. 1 but where the branch networks have the impedances $Z_a$ and $Z_b$ as shown. Only two of the four branch networks are shown in Fig. 2. Any general transfer impedance $Z_{12}$ as defined by Equation 1 may be written within a multiplicative constant in the form $$Z_{12} = \frac{s^m + a_{m-1}s^{m-1} + \ldots + a_1 s + a_0}{s^n + b_{n-1}s^{n-1} + \ldots + b_1 s + b_0} (n+1 \geq m)$$

$$= \frac{(s-s_1)(s-s_2)\ldots(s-s_m)}{(s-s_1')(s-s_2')\ldots(s-s_n')} \equiv \frac{p(s)}{q(s)} = \frac{E_2}{I_1} \quad (5)$$

where $a$, $b$, $s$ and $s'$ with a subscript are constants and $s$ is a variable.

If the transfer impedance $Z_{12}$ is to be realizable, it is necessary that $q(s)$ be a Hurwitz polynomial. For minimum-phase character of transfer impedance $Z_{12}$, $p(s)$ must also be a Hurwitz polynomial but the general non-minimum-phase function allows $p(s)$ to have zeros anywhere in the complex plane.

For the lattice structure shown in Fig. 2, the open-circuit transfer impedance $Z_{12}$ is given by the difference of two driving-point functions, namely $$Z_{12} = \frac{1}{2}(Z_b - Z_a) \quad (6)$$

If the poles of the transfer impedance $Z_{12}$ are simple and its numerator is of lower degree than the denominator, the partial fraction expansion of the impedance of each of the lattice arms has the form (as shown in "RLC Lattice Networks" by L. Weinberg, Proc. I.R.E., pp. 1139–1144, September 1953)

$$Z = \sum_{\mu=1}^{n} \frac{k_\mu}{s - s_\mu} \quad (7)$$

where $k$ is a constant which may be complex.

Considering complex conjugate poles as combined into one term, it is found that each of the partial fraction terms has the significant positive real characteristic, that is, the terms are separately realizable by inspection. Thus, the two types of terms that occur are given by $$Z_g = \frac{k_g}{s - s_g}$$

$$= \frac{\alpha_g}{s + a} \quad (8)$$

and $$Z_h = \frac{k_h}{s - s_h} + \frac{\bar{k}_h}{s - \bar{s}_h}$$

$$= \frac{\alpha_h + j\beta_h}{s + \sigma_h - j\omega_h} + \frac{\alpha_h - j\beta_h}{s + \sigma_h + j\omega_h} \quad (9)$$

$$= \frac{2\alpha_h(s + d_h)}{s^2 + \sigma_h s + |s_h|^2}$$

where $g$ and $h$ are particular values of $\mu$ and $\alpha$, $\beta$, $\sigma$, $\omega$ and $d$ are real and positive constants, and $d_v$ is not greater than $2\sigma_v$.

These terms are immediately realizable in the forms of networks shown in Figs. 3 and 4, and the complete lattice has branch networks containing a series connection of such networks. Fig. 3 shows the network $Z_g$ as having a capacitance element $C_g$ and a resistance element $R_g$ in parallel. Fig. 4 illustrates the network $Z_h$ as having three parallel branches, one with a resistance $R_h$, the second with a capacitance $C_h$, and the third with a series connection of an inductance $L_h$ and a resistance $R_h'$.

When $m=n$ one or both of the expansions for the lattice arms contains a constant term, and when $m=n+1$ at least one of the arms will contain a pole at infinity. Corresponding to these terms a series resistance element and a series inductance element respectively, will be present in the lattice arms. For a transfer impedance $Z_{12}$ that possesses multiple poles the method of realization explained in "RLC Lattice Networks" introduces a constant term into each of the lattice arms. This precludes obtaining a shunt capacitance at both input and output even when $m<n$; however, the method used in "A General RLC Synthesis Procedure" by L. Weinberg, Proc. I.R.E., vol. 42, No. 4, p. 427, February 1954, permits the desired capacitance to be obtained for this case.

It will now be shown that the real part of $$Y=\frac{1}{Z}$$

for $s=j\omega$, denoted hereafter by $Re[Y(j\omega)]$, has no zeros for all real values of $\omega$ including infinity, where $Z$ represents the form of the driving-point impedance of each of the lattice arms; that is, the lattice arms have nonminimum-conductive driving-point admittances. As a result a conductance may always be removed from each of the lattice arms without destroying the positive real quality of its driving-point function.

Since $Z_g$ and $Z_h$, given respectively in Equations 8 and 9, represent driving-point impedances, their real parts along the $j$-axis are never negative. It is furthermore clear from inspection of Equation 8 that the real part of $Z_g$ is nonzero at the origin and decreases monotonically to a zero value at infinite frequency. Similarly, for terms of the form of $Z_h$, inspection of Equation 9 shows that $Re[Z_h(j\omega)]$ is also finite and nonzero at the origin and has a zero value at infinite frequency, though its intermediate variation is not monotonic. It, too, possesses no zero in the real part for finite frequencies. If the given transfer impedance $Z_{12}$ is considered as a proper fraction with simple poles, then each of the lattice arms is of the form given by Equation 7 and the real part of $Z$ is the sum of the real parts of the two types of terms considered above. Suppose $Z$ is now written as $$Z=\frac{m_1+n_1}{m_2+n_2} \qquad (10)$$

wherein $m_1$ and $n_1$ represent respectively the even and odd parts of the numerator, while $m_2$ and $n_2$ define similar parts for the denominator.

Then $$Re[Z(j\omega)]=\frac{m_1m_2-n_1n_2}{m_2^2-n_2^2}\bigg|_{s=j\omega} \qquad (11)$$

and the above reasoning yields the conclusion that the numerator $(m_1m_2-n_1n_2)$ possesses no zeros for real $\omega$ and is therefore always positive. The total function $Re[Z(j\omega)]$ has a zero at infinity. As for the admittance $$Y=\frac{1}{Z}$$

its real part is given by $$Re[Y(j\omega)]=\frac{m_1m_2-n_1n_2}{m_1^2-n_1^2}\bigg|_{s=j\omega} \qquad (12)$$

from which it is noted that it has the same numerator as $Re[Z(j\omega)]$. Therefore $Re[Y(j\omega)]$ is always positive and nonzero except possibly for infinite $\omega$. But it is also nonzero at infinity, for the degree of the denominator will be greater than that of the numerator in Equation 12 only when $Z$ possesses no other terms except one or more of the form of $Z_h$ in each of which the constant $d$ is equal to $2\sigma$. Since it is always possible to make $d$ less than $2\sigma$, the conclusion may be stated: the $Re[Y(j\omega)]$ is always positive and nonzero for all finite and infinite real values of $\omega$.

Restricting the discussion to a proper fraction containing only simple poles represents no loss in generality, for the same conclusion applies in the other cases. If multiple poles are present in the given transfer impedance $Z_{12}$, a term whose real part is positive and nonzero for all values of $\omega$ is added to the lattice branch arm impedances. If the transfer impedance $Z_{12}$ as defined by Equation 5 the degree of $p$ is equal to the degree of $q$, a constant is added to one or both of the lattice branch arm impedances. Finally, if the degree of $p$ exceeds that of $q$, none of the transfer functions is physically realizable with a resistance termination at both input and output, as is demonstrated below.

It has been shown in "Synthesis of the Transfer Function of 2-Terminal Pair Networks" by R. Kahal, A.I.E.E. Proceedings, vol. 71, part 1, pp. 129–134, 1952, that a transfer voltage ratio such as defined by Equation 3 or 4 is not physically realizable if the degree of its numerator is greater than the degree of its denominator, that is, if a pole at infinity is present. But it is desired to terminate networks by resistance at both input and output. For such networks the same rational function within a constant multiplier represents the transfer voltage ratio, the transfer current ratio, the transfer admittance as defined in Equation 2, and the transfer impedance. Thus all four types of transfer functions, i.e., those defined by Equations 1 through 4, are unrealizable in the form of the desired network if the degree of the numerator exceeds that of the denominator. Another way of visualizing this is to note that if an open-circuited lattice structure is synthesized whose transfer impedance is given by such an improper rational fraction, then at least one of the impedances of the lattice branch arms must have a pole at infinity. Consequently, a conductance cannot be removed from the corresponding admittance because its real part will have a zero at infinite frequency.

The open-circuited lattice structure of Fig. 2 that has been derived may now be converted to the desired form. As shown above, the real part of each of the lattice branch arm admittances will have one or more positive nonzero minima; the smallest minimum of both admittances is now determined and may be denoted respectively by the conductances $G_a$ and $G_b$. It is then possible to obtain an equivalent lattice by removing from each of the arms a conductance of value less than the smaller of $G_a$ and $G_b$ and placing it in parallel with the input and output terminals of the lattice. This transformation is shown in Figs. 5a and 5b.

Figure 5A:
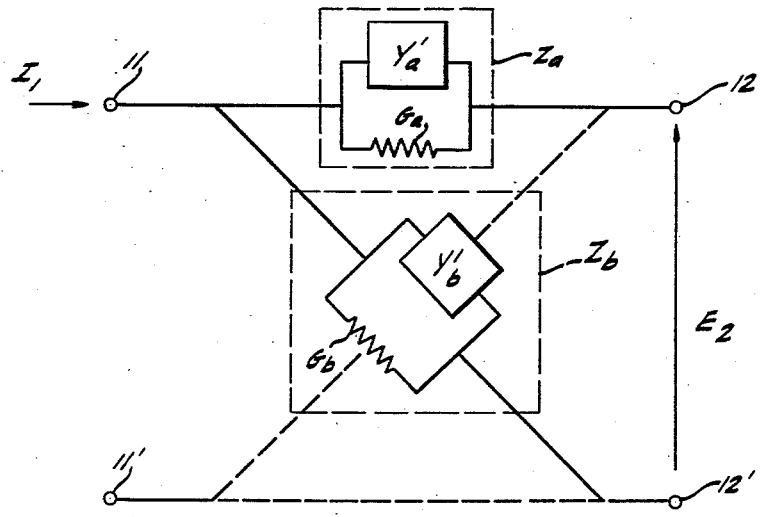
Figs. 5a and 5b are circuit diagrams, partly in block form, showing equivalent circuits, Fig. 5a illustrating an open circuited lattice structure and Fig. 5b its equivalent terminated at the input and output terminals.
Figure 5B:
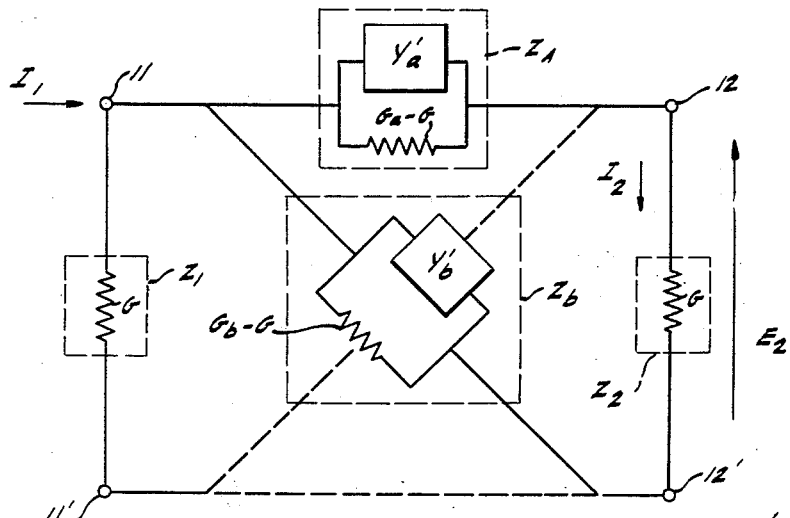

Fig. 5a is the open-circuited lattice structure identical to the one depicted in Fig. 2 except that the $Z_a$ of Fig. 2 is shown in the form of a parallel combination of an admittance $Y_a'$ and a conductance $G_a$, and $Z_b$ of Fig. 2 is shown in the form of a parallel combination of an admittance $Y_b'$ and a conductance $G_b$. The wave filter of Fig. 5b is the result of a transformation whereby a conductance $G$ is subtracted from $G_a$ and $G_b$, and where this conductance is put across the input terminals 11, 11' and the output terminals 12, 12'. The resulting wave filter shown in Fig. 5b therefore has the branch arms $Z_A$ and $Z_B$ and the input and output terminating networks $Z_1$ and $Z_2$ as shown in Fig. 1 where:

$$Z_A=\frac{1}{Y_a'+(G_a-G)}$$

$$Z_B=\frac{1}{Y_b'+(G_b-G)}$$

$$Z_1=Z_2=\frac{1}{G}$$

Figure 6:
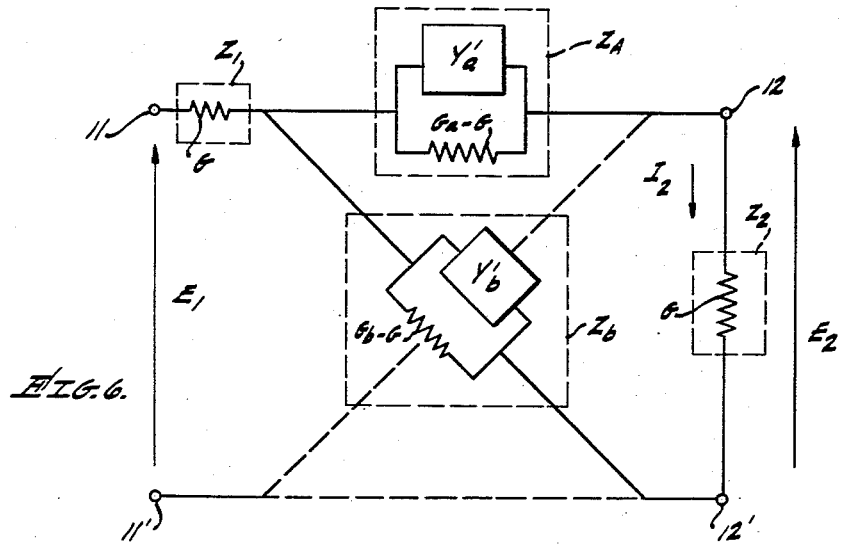
Fig. 6 is a circuit diagram, partly in block form, showing an equivalent circuit of that of Fig. 5a having a termination across the output terminals only.

To obtain $R_v$ and $Y_{12}$ as defined by Equations 2 and 3 requires merely an application of Thevenin's theorem to the input; this yields the network of Fig. 6 for which $$R_v = \frac{E_2}{E_1}$$
$$= \frac{GE_2}{I_1}$$
$$= GZ_{12} \quad (13)$$

and $$Y_{12} = \frac{I_2}{E_1}$$
$$= \frac{GE_2}{E_1} \quad (14)$$
$$= GR_v$$
$$= G^2 Z_{12}$$

where $G$ is the conductance used in the transformation shown in Figs. 5a and 5b.

Fig. 6 is the lattice structure of Fig. 5b where the input terminating network $Z_1$ is transposed so as to be in series with the input terminal 11. It thereby illustrates the lattice structure for which Equations 13 and 14 are given.

It is clear from the above equations that the constant gain factor achieved for the transfer voltage ratio is directly proportional to $G$. This makes it desirable, if one is interested in gain, to remove as large a conductance as possible from the arms. However, one may be more interested in using low-Q coils for the realization of the lattice arms, which problem is discussed below; in this case it is necessary to retain a large conductance in each of the lattice arms.

For realizing the remainder of the lattice arms, that is, the admittances $Y_a'$ and $Y_b'$ as shown by the network of Fig. 6, the Bott-Duffin procedure as shown in "Impedance Synthesis Without Use of Transformers" by R. Bott and R. J. Duffin, Jour. Appl. Phys., August 1949, p. 816, may be used. This yields a network containing pure inductances but no mutual inductance. However, it is desired that every inductance element possess an associated series resistance element; to achieve this a new variable $(s-h)$ is substituted for $s$ before using the Bott-Duffin method, that is, use is made of the technique of predistortion introduced in "Synthesis of Reactance Four-Poles" by S. Darlington, Jour. Math. Phys., September 1939, pp. 257–353.

Predistortion requires that for each branch arm admittance, the equation of the curve in the left half of the complex plane that represents the locus on which the admittance has a zero real part is determined. For example, working with the series arm, $$Y_1 = Y_a' + (G_a - G)$$
$$= \frac{u_1(\sigma, \omega) + jv_1(\sigma, \omega)}{u_2(\sigma, \omega) + jv_2(\sigma, \omega)} \quad (15)$$

where $u_1, u_2, v_1$, and $v_2$ are functions of $\sigma$ and $\omega$, the curve obtained is $$Re[Y_1] = f(\sigma, \omega)$$
$$= u_1 u_2 + v_1 v_2 = 0 \quad (16)$$

Considering $\sigma$ as an implicit function given by $f(\sigma, \omega)$ and evaluating the derivative $$\frac{d\sigma}{d\omega} = -\frac{\frac{\delta f}{\delta \omega}}{\frac{\delta f}{\delta \sigma}} \quad (17)$$

the smallest minimum value of $\sigma$ is found, that is, the point at which the curve is closest to the $j$ axis. To each of the zeros and poles of the $Y_1$ the positive constant may now be added, which is chosen less than or equal to this minimum distance, without destroying the positive real quality of $Y_1$. Then, after realization of the arm by the Bott-Duffin procedure, the network obtained is corrected for the predistortion: for every $L$ a series combination of $L$ and a resistance element of $Lh$ ohms is substituted, while every $C$ is replaced by a parallel combination of $C$ and a conductance element of $Ch$ mhos. A similar procedure is followed for the diagonal arm.

Finally, if the given transfer function is a proper fraction, it is clear that the admittances of both of the lattice branch arms will possess a pole at infinity and a corresponding shunt capacitance element in their network representations. Thus a capacitance element may be removed from each of the branch arms yielding an equivalent lattice structure with a shunt capacitance element at the input and output terminals.

The steps in the synthesis procedure may now be summarized as follows:

(1) Realize the given function as an open-circuited lattice by the method described above.

(2) Obtain an equivalent lattice with a shunt conductance element at the input and output terminals of the lattice structure of Fig. 2. If the degree of the numerator of the given transfer function is lower than that of the denominator, also remove a shunt capacitance element from each of the lattice branch arms.

(3) Predistort each of the remaining lattice admittances as explained above. Then realize each arm by the Bott-Duffin procedure, after which the branch networks obtained are corrected for the predistortion.

(4) If necessary, use Thevenin's theorem on the input to obtain the given type of transfer function.

To demonstrate the complete procedure in accordance with method I, an illustrative example is given below. Suppose a resistance-terminated wave filter is to be designed having, within a multiplicative constant, the non-minimum phase transfer signal voltage ratio $R_v$, $$R_v = \frac{E_2}{E_1} = \frac{s^2 - s - 12.4}{10s^2 - 46s - 60} \quad (18)$$

First, the above function is represented as the transfer impedance of an open-circuited lattice structure. Using method I outlined above, it is found that $$Z_b = \frac{s^2 + 6s + 10}{5s^2 + 23s + 30}$$

$$Z_a = \frac{7s + 22.4}{5s^2 + 23s + 30} \quad (19)$$

Figure 7:
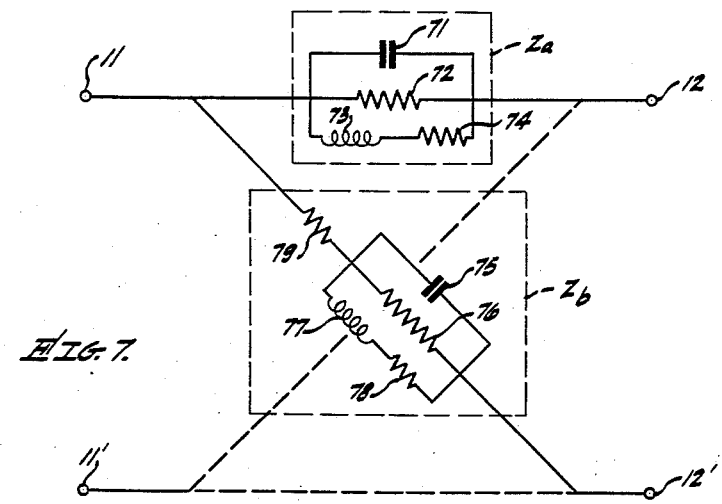
Figs. 7, 8 and 9 are circuit diagrams of equivalent forms of a wave filter in accordance with this invention in order to explain its synthesis in successive steps.

Fig. 7 shows a circuit diagram of the balanced and symmetrical lattice structure whose branch arms have the impedances $Z_a$ and $Z_b$ respectively, as indicated by dotted lines, which correspond to the Equation 19. The impedance $Z_a$ of Fig. 7 comprises a parallel combination of capacitor 71, resistor 72, and inductor 73 serially connected to resistor 74. The impedance $Z_b$ of Fig. 7 also comprises a parallel combination of three branches: capacitor 75, resistor 76, and the third branch consisting of inductor 77 serially connected to resistor 78, where said parallel combination is serially connected to resistor 79.

The circuit constants obtained from Equation 19 for the network of Fig. 7 are as follows:

| | | |
|---|---|---|
| Capacitor 71 | farads | 5/7 |
| Capacitor 75 | do | 25/7 |
| Inductor 73 | henries | 35/38 |
| Inductor 77 | do | 343/1250 |
| Resistor 72 | ohms | 1 |
| Resistor 74 | do | 56/19 |
| Resistor 76 | do | 49/305 |
| Resistor 78 | do | 196/250 |
| Resistor 79 | do | 1/5 |

It is obvious from the form $Z_a$ has assumed in Fig. 7 that after the removal of a conductance of one mho from $Y_a$, the admittance is $$Y_a - 1 = \frac{5}{7}s + \frac{7.6}{7s + 22.4} \tag{20}$$

Similarly, if a conductance of one mho is removed from $Y_b$, a positive real remainder is obtained, $$Y_b - 1 = \frac{4s^2 + 17s + 20}{s^2 + 6s + 10} \tag{21}$$

Thus, this conductance may be removed from the lattice branch arms to yield an equivalent resistance-terminated lattice structure. The remainder of the diagonal branch arm admittance $(Y_b - 1)$ has a zero real part curve whose closest point to the $j$-axis occurs at $\sigma = -2$. Substituting the new variable $(s-2)$ for $s$ in the remainder and using the Bott-Duffin procedure, the new admittance $Y_b$ is obtained, namely $$Y_b' = \frac{4s^2 + s + 2}{s^2 + 2s + 2} \tag{22}$$

Figure 8:
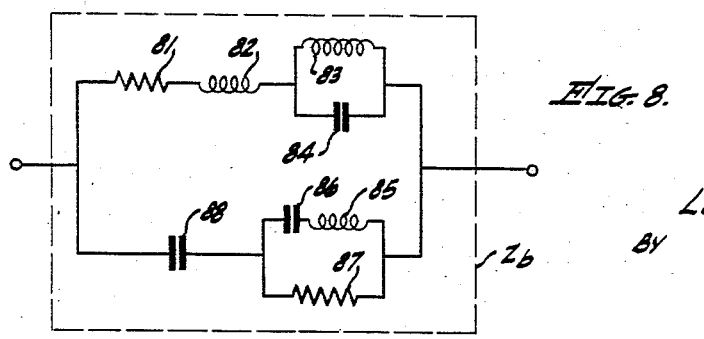

Fig. 8 shows a circuit diagram of the branch arm impedance $Z_b'$ as indicated after the removal of a conductance of one mho and predistortion. The impedance $Z_b'$ corresponding to Equation 22 comprises a first and a second branch in parallel. The first branch has resistor 81, inductor 82 and the parallel combination of inductor 83 and capacitor 84 serially connected to one another. The second branch has capacitor 88 serially connected to a parallel combination of resistor 87 and capacitor 86 serially connected to inductor 85.

The circuit constants obtained from Equation 22 for the network of Fig. 8 are as follows:

| | | |
|---|---|---|
| Capacitor 84 | farads | 4/5 |
| Capacitor 86 | do | 5 |
| Capacitor 88 | do | 1 |
| Inductor 82 | henries | 1/4 |
| Inductor 83 | do | 5/4 |
| Inductor 85 | do | 1/5 |
| Resistor 81 | ohms | 1 |
| Resistor 87 | do | 1/4 |

Figure 9:
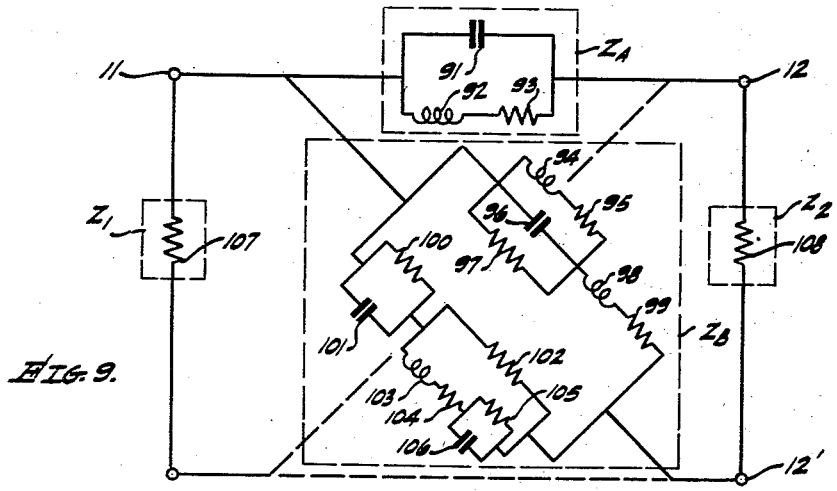

The network of Fig. 8 is now corrected for the predistortion that was previously introduced by substituting $(s-2)$ for $s$. Now applying Thevenin's theorem to the input of the lattice structure thus obtained, the circuit diagram of Fig. 9 is finally realized which has an impedance $Z_A$ corresponding to Equation 20, an impedance $Z_B$ corresponding to Equation 22, and impedances $Z_1$ and $Z_2$ equal to one ohm. This then establishes a correspondence between Fig. 9 and Fig. 1.

The wave filter of Fig. 9 includes a resistor 107 representing the impedance $Z_1$ as indicated by dotted lines and connected across the input terminals 11, 11' and resistor 109 which represents the impedance $Z_2$ as shown by the dotted lines connected across the output terminals 12, 12'. The four branch arms of the lattice structure have, respectively, the impedances $Z_A$, $Z_B$ as shown by the dotted lines. The impedance $Z_A$ of the wave filter of Fig. 9 includes a capacitor 91 across which are connected inductor 92 and resistor 93 connected in series. The impedance $Z_B$ consists of two parallel branches. The first branch of the impedance $Z_B$ includes capacitor 96, inductor 98, and resistor 99 conected in series. Inductor 94 and resistor 95 are connected in parallel across capacitor 96 as is resistor 97. The second branch arm of the impedance $Z_B$ comprises the parallel combination of resistor 100 and capacitor 101 connected in series with resistor 102 across which are connected inductor 103, resistor 104, and the parallel combination of resistor 105 and capacitor 106.

The circuit constants obtained from Equations 20 and 22 for the network of Fig. 9 are as follows:

| | | |
|---|---|---|
| Capacitor 91 | farads | 5/7 |
| Capacitor 96 | do | 4/5 |
| Capacitor 101 | do | 1 |
| Capacitor 106 | do | 5 |
| Inductor 92 | henries | 35/38 |
| Inductor 94 | do | 5/4 |
| Inductor 98 | do | 1/4 |
| Inductor 103 | do | 1/5 |
| Resistor 93 | ohms | 56/19 |
| Resistor 95 | do | 5/2 |
| Resistor 97 | do | 5/8 |
| Resistor 99 | do | 3/2 |
| Resistor 100 | do | 1/2 |
| Resistor 102 | do | 1/4 |
| Resistor 104 | do | 2/5 |
| Resistor 105 | do | 1/10 |
| Resistor 107 | do | 1 |
| Resistor 108 | do | 1 |

*Method II*

Whereas method I begins with the step of computing the constants for the branch networks of an open-circuited symmetrical and balanced lattice structure for a given transfer function, method II begins with the step of computing the constants for the branch networks of a symmetrical and balanced lattice structure which is open-circuited across its input terminals and which has a resistive terminating network across its output. The second step of both methods is identical insofar as the removal of the input and output terminating networks from the branch networks of the wave filter are concerned. Since the termination networks removed are always identical, it is obvious that method I will result in the design of a wave filter having identical terminations, while method II will result in the design of a wave filter having an output termination network which is equal to the parallel combination of the input terminating network and the resistive terminating network which was computed across the output terminals by the first step of method II. Generally speaking, method II may also be used to design a wave filter having identical terminations but the resulting wave filter will have different values of $Z_A$ and $Z_B$ than those obtainable by the application of method I.

It is desired to realize the given transfer function $$R_v = \frac{E_2}{E_1} = \frac{p}{Hq} \tag{23}$$

as an open-circuited lattice with as large a gain (that is, as small an H) as possible, where H is a positive constant. The given transfer function may be set to $$R_v = \frac{p}{Hq} = \frac{Z_b - Z_a}{Z_b + Z_a} \tag{24}$$

as explained in "A General RLC Synthesis Procedure," and segregated into the sum of two polynomials, so that then $q$ becomes $$q = q_1 + A q_1' \tag{25}$$

where $q_1$ is a Hurwitz polynomial, A is a positive real constant and $q_1'$ is the derivative of $q_1$ with respect to $s$. This can always be done. After dividing the numerator and denominator of the resulting K by $q_1$ to obtain $$K = \frac{\frac{p}{q_1}}{H\left(1 + \frac{A q_1'}{q_1}\right)} \tag{26}$$

$p/q_1$ is then expanded into partial fractions. Its residues are in general positive or negative real for real poles and complex for complex poles. A similar expansion of $Aq_1'/q_1$ makes the total denominator of $R_v$.

$$H\left(1+\frac{Aq_1'}{q_1}\right)=H\left(k_0^{(d)}+\frac{k_1^{(d)}}{s-s_1}+\frac{k_2^{(d)}}{s-s_2}+\ldots\right) \quad (27)$$

where $k_0^{(d)}=1$, and all the residues $k_\mu^{(d)}$ for $\mu \neq 0$ are equal to A. If $(Z_b-Z_a)$ and $(Z_b+Z_a)$ are also thought of as expanded in partial fractions, the residues of like terms of $p/q_1$ and $(Z_b-Z_a)$ may be equated as may those of $H(1+Aq_1'/q_1)$ and $(Z_b+Z_a)$. Thus $$k_\mu^{(b)}-k_\mu^{(a)}=k_\mu^{(n)} (\mu=0, 1, 2, \ldots m)$$

$$k_\mu^{(b)}+k_\mu^{(a)}=Hk_\mu^{(d)} \text{ where } m \text{ is the degree of } q \quad (28)$$

where the superscripts $(a)$, $(b)$, $(n)$ and $(d)$ refer respectively to $Z_a$, $Z_b$, and the numerator and denominator of K, while the subscript $\mu$ designates the poles $s_\mu=-\sigma_\mu+j\omega_\mu$, or $s_\mu=-\sigma_\mu-j\omega_\mu$, or $s_\mu=-\sigma_\mu$ in which $\sigma_\mu$ and $\omega_\mu$ are positive.

Solving Equation 28 for the unknown $Z_a$ and $Z_b$ residues as indicated in Equation 29 below, $$k_\mu^{(b)}=\frac{1}{2}(Hk_\mu^{(d)}+k_\mu^{(n)})$$

$$\alpha_\mu^{(b)}+j\beta_\mu^{(b)}=\frac{1}{2}(Hk_\mu^{(d)}+\alpha_\mu^{(n)}+j\beta_\mu^{(n)}) \quad (29)$$

$$k_\mu^{(a)}=\frac{1}{2}(Hk_\mu^{(d)}-k_\mu^{(n)})$$

$$\alpha_\mu^{(a)}+j\beta_\mu^{(a)}=\frac{1}{2}(Hk_\mu^{(d)}-\alpha_\mu^{(n)}-j\beta_\mu^{(n)})$$

finally yields $\mu \neq 0$ $$\alpha_\mu^{(b)}=\frac{1}{2}(HA+\alpha_\mu^{(n)}); \ \alpha_\mu^{(a)}=\frac{1}{2}HA-\alpha_\mu^{(n)})$$

$$\beta_\mu^{(b)}=\frac{1}{2}\beta_\mu^{(n)}; \ \beta_\mu^{(a)}=-\frac{1}{2}\beta_\mu^{(n)} \quad (30)$$

$\mu=0$ $$\alpha_0^{(b)}=\frac{1}{2}(H+\alpha_0^{(n)}); \ \alpha_0^{(a)}=\frac{1}{2}(H-\alpha_0^{(n)})$$

For negative real poles the requirement that the residues, $\alpha_\mu^{(a)}$ and $\alpha_\mu^{(b)}$, be real and positive when used in conjunction with Equation 30, gives as the condition to be satisfied for $\mu \neq 0$ $$-1 \leq \frac{\alpha_\mu^{(n)}}{HA} \leq 1 \quad (31)$$

and for $\mu=0$ substitute unity for A. This, of course, is the same as the condition that arises in the Bower-Ordung RC synthesis, ("The Synthesis of Resistor-Capacitor Networks," Proc. I.R.E., pp. 263-269, March 1950) since for an RC lattice the poles must all be real. In the general synthesis considered here, however, the complex poles must also be provided for. The real parts of the residues in these complex poles must not only be positive, but must also be equal to or greater than a positive constant $c_\mu$ which is defined below. This is seen by application to the residues of $Z_a$ of the condition for realizability.

$$\frac{|\beta_\mu^{(a)}|}{\alpha_\mu^{(a)}} \leq \frac{\sigma_\mu}{\omega_\mu} \quad (32)$$

or $$\alpha_\mu^{(a)} \geq \frac{|\beta_\mu^{(a)}|\omega_\mu}{\sigma_\mu}=c_\mu \text{ (positive constant)}$$

$$\geq \frac{\frac{1}{2}|\beta_\mu^{(n)}|\omega_\mu}{\sigma_\mu}=c_\mu \quad (33)$$

When the constant $c_\mu$ is substituted in those relations of Equation 30 for which $\mu \neq 0$, the conditions to be satisfied become $$1 \geq \frac{2c_\mu-\alpha_\mu^{(n)}}{HA} \quad (34)$$

and $$1 \geq \frac{2c_\mu+\alpha_\mu^{(n)}}{HA} \quad (35)$$

Only the stronger of the two inequalities need to be satisfied for any specific complex pole. If $\alpha_\mu^{(n)}$ is positive, Equation 35 is the stronger and must be used to determine the minimum value of H; if $\alpha_\mu^{(n)}$ is negative, Equation 34 is used. Therefore, to summarize the two steps for the complex poles, first the $c_\mu$ for each pole must be determined and then the value of H that is necessary to satisfy the stronger of Equations 34 and 35.

By satisfaction also of Equation 31 for the real poles the necessary value of H for each pole may be tabulated. In doing this the equal signs may be used in Equation 31, 34 and 35; then a value of H greater than the largest required value is chosen, which automatically guarantees the satisfaction of the condition for each pole with the inequality sign. This is necessary in order that every inductance appear with an associated resistance and that each of the partial-fraction components (complex conjugate poles taken in pairs) of $$Z_a=k_0^{(a)}+\frac{k_1^{(a)}}{s-s_1}+\frac{k_2^{(a)}}{s-s_2}+\ldots+\frac{k_m^{(a)}}{s-s_m} \quad (36)$$

and $$Z_b=k_0^{(b)}+\frac{k_1^{(b)}}{s-s_1}+\frac{k_2^{(b)}}{s-s_2}+\ldots+\frac{k_m^{(b)}}{s-s_m}$$

be positive real. Then $Z_a$ and $Z_b$ may be realized by inspection in the Foster manner for two-element kind networks; every inductance will have an associated series resistance.

One final point, useful in the subsequent procedures, is made regarding the constant term in Equation 36. As is obvious from Equation 30 for $\mu=0$, this constant term is always obtainable. Furthermore, if the degree of $p$ is less than that of $q$, then $$\alpha_0^{(b)}=\alpha_0^{(a)}=\frac{1}{2}H \quad (37)$$

while if the degrees of $p$ and $q$ are equal, $$\alpha_0^{(b)}=\alpha_0^{(a)}+1=\frac{1}{2}(H+1) \quad (38)$$

The use of the above equations, along with the definition of $c_\mu$ given in Equation 33, allows further for a synthesis to be carried out.

To obtain the transfer impedance $$Z_{12}=\frac{E_2}{I_1}=\frac{p}{Hq} \quad (39)$$

as a resistance-terminated lattice, it is possible to make use of the following relation where the $y$'s are the familiar short-circuit admittances $$I_1=y_{11}E+y_{12}E_2$$

$$I_2=y_{21}E_1+y_{22}E_2$$

so that for a pure resistive load of 1 ohm, $E_2=-I_2$, and $$Y_{12}=\frac{I_2}{E_1}=\frac{y_{12}}{1+y_{22}} \quad (40)$$

Therefore, by Equation 40, $$Z_{12}=\frac{z_{12}}{1+z_{22}}=\frac{\frac{1}{2}(Z_b-Z_a)}{1+\frac{1}{2}(Z_b+Z_a)} \quad (41)$$

A procedure similar to the one described above for determining an open-circuited lattice having a predetermined transfer function, makes possible the identification for direct synthesis of the resistance-terminated lattice. The wave filter obtained, however, is the same as the one obtained by an application of the reciprocity theory and the well known lattice transformation to the open-circuited lattice. For the sake of simplicity, the following demonstration will be limited to the method for realizing the open-circuited lattice as the basic one from which the other desirable forms of wave filters are derived.

Figure 10:
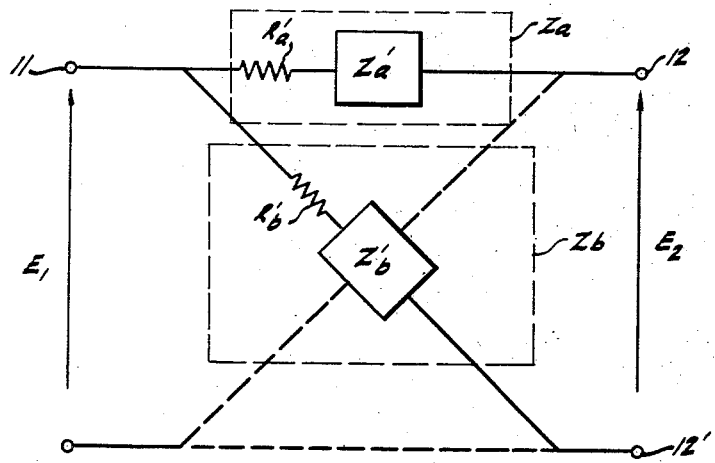

As observed previously, a series resistance is always present in each arm of the open-circuited lattice. Fig. 10 shows the circuit diagram (partly in block form) of the open-circuited lattice where the branch arm impedance $Z_a$ and $Z_b$ are each shown as the sum of a resistance and an impedance. The branch arm impedance $Z_a$ of Fig. 10 consists of the branch arm resistor $R_a'$ serially connected to impedance $Z_a'$. Similarly, the branch arm impedance $Z_b$ is shown as the branch arm resistor $R_b'$ serially connected to impedance $Z_b'$.

Figure 11:
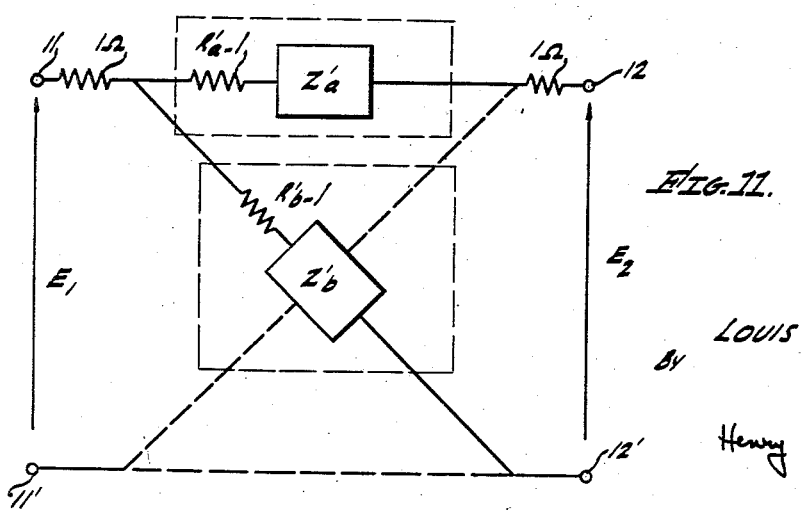

It is always possible to derive an equivalent lattice structure by removing a resistance of one ohm from each branch arm, as shown in Fig. 11. Fig. 11 shows an open-circuited lattice structure which is identical to that shown in Fig. 10, except that a resistance of one ohm is subtracted from each resistor $R_a'$ and $R_b'$, and the two resulting one-ohm resistors are serially connected to the input terminal 11 and output terminal 12, respectively.

The circuit shown in Fig. 11 may be converted to one with a current source by the use of Norton's theorem and the one-ohm series resistance at the output terminal may be omitted since the output is open-circuited. Fig. 12 shows the above transformation of Fig. 11, that is, a current source and the one-ohm resistor connected across the input terminals 11, 11' and an open circuit at the output terminals.

The desired network with a resistor across the output terminals can then be obtained by application of the reciprocity theorem. The final form of a lattice network thus obtained is shown in Fig. 13. In order to design a wave filter having unequal input and output impedances, the latter part of method I is employed.

To demonstrate the complete procedure of method II, a second illustrative example is given below. Suppose a wave filter is to be designed having the nonminimum phase transfer impedance within a multiplicative constant.

$$Z_{12} = \frac{1}{s^2 + 4s + 7} \tag{42}$$

Suppose further the wave filter is to be terminated in a parallel combination of a resistance element and a capacitance element at both the input and the output terminals of a lattice structure, and where the resistance elements are unequal.

The first step is to realize $$\frac{E_2}{E_1} = \frac{p}{Hq} = \frac{Z_b - Z_a}{Z_b + Z_a} \tag{43}$$

as an open-circuited lattice and then by transformations obtain the desired $Z_{12}$. The breakdown $q = q_1 + Aq_1'$ for $A = 1$ yields $$q_1 = s^2 + 2s + 5$$

and therefore $$\frac{1}{q_1} = \frac{\frac{-j}{4}}{s+1-j2} + \frac{\frac{j}{4}}{s+1+j2} \tag{44}$$

By inspection it is seen that $$\alpha_1^{(n)} = 0$$

$$\beta_1^{(n)} = \frac{-j}{4}$$

$$\sigma_1 = 1$$

$$\omega_1 = 2 \tag{45}$$

Also it is found from $$c_\mu = \frac{\frac{1}{2}|\beta_\mu^{(n)}|\omega_\mu}{\sigma_\mu} \tag{46}$$

that $$c_1 = 4$$

By use of the inequality $$1 \geq \frac{2c_1 - \alpha_1^{(n)}}{HA} \tag{47}$$

one obtains $$H \geq 8$$

Hence, we may choose $H = 10$. Therefore $$\alpha_1^{(b)} = 5 \quad \alpha_1^{(a)} = 5$$

$$\beta_1^{(b)} = \frac{-j}{8} \quad \beta_1^{(a)} = \frac{j}{8}$$

$$\alpha_0^{(b)} = 5 \quad \alpha_0^{(a)} = 5 \tag{48}$$

The lattice arms are then given by $$Z_a = 5 + \frac{10s + 9.5}{s^2 + 2s + 5} \tag{49}$$

$$Z_b = 5 + \frac{10s + 10.5}{s^2 + 2s + 5} \tag{50}$$

Fig. 14 shows a circuit diagram of the balanced and symmetrical lattice structure whose branch arms have the impedances $Z_a$ and $Z_b$ respectively, which correspond to the Equations 49 and 50. The impedance $Z_a$ of Fig. 14 comprises capacitor 144, resistor 145, and inductor 142 serially connected to resistor 143 in parallel combination, this parallel combination being serially connected to resistor 141. The impedance $Z_b$ of Fig. 14 comprises capacitor 149, resistor 150, and inductor 147 serially connected to resistor 148 in parallel combination, this parallel combination being serially connected to resistor 146.

The circuit constants obtained from Equations 49 and 50 for the network of Fig. 14 are as follows:

| | | |
|---|---|---|
| Capacitor 144 | farads | 0.1 |
| Capacitor 149 | do | 0.1 |
| Inductor 142 | henries | 2.5 |
| Inductor 147 | do | 2.5 |
| Resistor 141 | ohms | 5 |
| Resistor 143 | do | 2.625 |
| Resistor 145 | do | 9.52 |
| Resistor 146 | do | 5 |
| Resistor 148 | do | 2.375 |
| Resistor 150 | do | 1/0.095 |

The application of the transformations given in the detailed presentation of the procedure gives the lattice terminated in resistance at the output driven by a current source. The resulting lattice structure is shown in Fig. 15.

Fig. 15 is a circuit diagram of a lattice structure in accordance with the above transformation being open circuited across the input terminals 11, 11', and having a resistor 159 connected across the output terminals 12, 12'. The branch arms of the lattice structure have the impedance $Z_a$ and $Z_b$ respectively. The impedance $Z_a$ is shown in Fig. 15 as the parallel combination of capacitor 153, resistor 154, and inductor 151 serially connected to resistor 152. The impedance $Z_b$ of Fig. 15 comprises the parallel combination of resistor 158, capacitor 157, and inductor 155 serially connected to resistor 156.

The circuit constants obtained for the network of Fig. 15 are as follows:

| | | |
|---|---|---|
| Capacitor 153 | farads | 0.1 |
| Capacitor 157 | do | 0.1 |
| Inductor 151 | henries | 2.5 |
| Inductor 155 | do | 2.5 |
| Resistor 152 | ohms | 2.625 |
| Resistor 154 | do | 9.52 |
| Resistor 156 | do | 2.375 |
| Resistor 158 | do | 1/0.095 |
| Resistor 159 | do | 5 |

Now removing from each arm a capacitance equal to 0.1 farad and a resistance equal to 1/0.105=9.52 ohms, we obtain the wave filter shown in Fig. 16.

Fig. 16 is a circuit diagram of the wave filter in its final form having an input terminating network $Z_1$, an output terminating network $Z_2$, and the lattice branch arms $Z_A$ and $Z_B$. The input terminating network $Z_1$ comprises the parallel combination of resistor 165 and capacitor 166. The output terminating network $Z_2$ comprises resistor 167 connected in parallel with capacitor 168. The branch arm network $Z_A$ comprises inductor 160 serially connected to resistor 161. The branch arm $Z_B$ comprises the parallel combination of resistor 164 and inductor 162 serially connected to resistor 163.

The circuit constants obtained for the network of Fig. 16 are as follows:

| | | |
|---|---|---|
| Capacitor 166 | farads | 0.1 |
| Capacitor 168 | do | 0.1 |
| Inductor 160 | henries | 2.5 |
| Inductor 162 | do | 2.5 |
| Resistor 161 | ohms | 2.625 |
| Resistor 163 | do | 2.375 |
| Resistor 164 | do | 1.0 |
| Resistor 165 | do | 9.52 |
| Resistor 167 | do | 3.28 |

The wave filters of this invention which are synthesized by the above described methods may use simple electrical networks which may provide any desired transfer characteristics. The wave filters of this invention have the advantage over those of the prior art in that they do not require ideal transformers, mutual inductance elements or pure inductance elements in order to achieve the desired transfer characteristics. The synthesis which has been described above will provide at all times a wave filter which comprises only resistive elements, capacitive elements and inductive elements serially connected to resistive elements. The wave filters of the prior art were usually synthesized and the required components approximated by physically realizable circuit elements. Such approximation produces ordinarily a deterioration of the transfer characteristics of such wave filters.

The wave filter of this invention is not limited to the particular terminating network shown in the drawings. For instance, as indicated, $Z_1$ and $Z_2$ may be purely capacitive or purely resistive, or a parallel combination of a capacitive and resistive element.

What is claimed is:

1. A wave filter comprising a lattice network having a transfer impedance $$Z_{12} = \frac{p(s)}{q(s)}$$

where $s$ is a complex variable; the transfer impedance having simple poles and $p(s)$ being of lower degree than $q(s)$, wherein the partial fraction expansion of the impedance of each of the lattice arms of the network has a significant positive real characteristic; the wave filter including input and output termination networks having given conductance values corresponding to less than the smallest positive non-zero minima of the admittances of the lattice arms when the lattice network is synthesized as a symmetrical and balanced structure which is at least open circuited across its input terminals; the conductance values of the branch arms of the lattice structure being equal to the conductance of said admittances reduced by the amount of said given conductance values; the admittances of the branch arms of said lattice structure being realized by the Bott-Duffin procedure modified by predistortion, and being corrected for said predistortion; and said branch arms consisting only of resistance elements, capacitance elements and realizable inductance elements having an inductive component and a resistive component and where the inductance associated with each of said realizable inductance elements of said branch arms is not mutually coupled to the inductance of any of the other inductance elements.

2. A wave filter comprising a lattice network having a transfer impedance $$Z_{12} = \frac{p(s)}{q(s)}$$

where $s$ is a complex variable; the transfer impedance having simple poles and $p(s)$ being of lower degree than $q(s)$, wherein the partial fraction expansion of the impedance of each of the lattice arms of the network has a significant positive real characteristic; the wave filter including input and output termination networks having given conductance values corresponding to less than the smallest positive non-zero minima of the admittances of the lattice arms when the lattice network is synthesized as an open circuited, symmetrical and balanced structure; the conductance values of the branch arms of the lattice structure being equal to the conductance of said admittances reduced by the amount of said given conductance values; the admittances of the branch arms of said lattice structure being realized by the Bott-Duffin procedure modified by predistortion, and being corrected for said predistortion; and said branch arms consisting only of resistance elements, capacitance elements and realizable inductance elements having an inductive component and a resistive component and where the inductance associated with each of said realizable inductance elements of said branch arms is not mutually coupled to the inductance of any of the other inductance elements.

3. A wave filter comprising a lattice network having a transfer impedance $$Z_{12} = \frac{p(s)}{q(s)}$$

where $s$ is a complex variable; the transfer impedance having simple poles and $p(s)$ being of lower degree than $q(s)$, wherein the partial fraction expansion of the impedance of each of the lattice arms of the network has a significant positive real characteristic; the wave filter including an input termination network having a given conductance value corresponding to less than the smallest positive non-zero minima of the admittances of the lattice arms when the lattice network is synthesized as a symmetrical and balanced structure open circuited across its input terminals, and an output termination network being equal to the parallel combination of the input termination network and a resistive termination network computed across the output terminals when the lattice network is synthesized as a symmetrical and balanced structure open circuited across its input terminals; the conductance values of the branch arms of the lattice structure being equal to the conductance of said admittances reduced by the amount of said given conductance value; the admittances of the branch arms of said lattice structure being realized by the Bott-Duffin procedure modified by predistortion, and being corrected for said predistortion; and said branch arms consisting only of resistance elements, capacitance elements and realizable inductance elements having an inductive component and a resistive component and where the inductance associated with each of said realizable inductance elements of said branch arms is not mutually coupled to the inductance of any of the other inductance elements.

References Cited in the file of this patent

UNITED STATES PATENTS

| | | |
|---|---|---|
| 1,918,393 | Holden | July 18, 1933 |
| 1,955,788 | Bode | Apr. 24, 1934 |
| 2,458,553 | Boghosian et al. | Jan. 11, 1949 |
| 2,549,065 | Dietzold | Apr. 17, 1951 |

OTHER REFERENCES

Weinberg: Proceedings of the I.R.E., vol. 42, No. 2, February 1954, pages 427–437.